April 19, 1960 B. P. BOGERT 2,933,702

TIME REVERSAL DELAY DISTORTION CORRECTOR

Filed Nov. 29, 1956

INVENTOR
B. P. BOGERT
BY Harry C. Hart
ATTORNEY

United States Patent Office 2,933,702
Patented Apr. 19, 1960

2,933,702

TIME REVERSAL DELAY DISTORTION CORRECTOR

Bruce P. Bogert, Morristown, N.J., assignor to Bell Telephone Laboratories, Incorporated, New York, N.Y., a corporation of New York Application November 29, 1956, Serial No. 625,117
9 Claims. (Cl. 333—28)

This invention relates generally to signal transmission systems and in particular to apparatus for the elimination of time delay distortion normally impressed upon signals transmitted over conventional channels.

It is well known in the signal transmission art that signals sent from a transmitting station to a receiving station suffer distortion in greater or less degree owing to the fact that physically realizable transmission channels for interconnecting two such stations have velocity dispersive effects upon signals of different frequencies. That is to say, a signal wave having a plurality of different frequency components, after traversing a transmission channel, becomes distorted because of the different velocities with which the various frequency components of the wave are transmitted.

Recognizing this problem, workers skilled in the art have in the past turned to a correcting device, the phase equalizer. These equalizers are, in general, complex networks having frequency-velocity response characteristics inverse to those of the transmission line with which they are designed to operate. These equalizers have met with some success. They have, however, been open to several objections. They become extremely complex if designed to yield full compensation over a wide frequency range. Next, having been fixed in their construction, they are not amenable to convenient adjustment with variations in the characteristics of the transmission channel with which they operate. Thus, temperature fluctuations may upset the equalization of a long transmission channel exposed to the atmosphere. Finally, the equalizer of the past has been a single purpose device. Designed for one particular transmission channel, it is not adaptable to employment in any other channel. Hence, in several aspects, both technical and economic, these prior art equalizers leave something to be desired.

It is, accordingly, a general object of this invention to eliminate all delay distortion from a transmission system in a simple fashion.

It is a further object of this invention to accomplish distortion elimination without regard to the distortion characteristics of a particular transmission system.

It is a still further object of this invention to correct delay distortion of a transmitted signal whatever the frequency content of that signal may be.

These objects the invention achieves with the recognition that a transmission channel itself may correct the very distortions it imposes upon a signal if that signal be applied in proper sense to a proper portion of the transmission channel. Hence, in accordance with a principal feature of the invention, a signal, or a short portion of a long signal, distorted by the velocity dispersion of one segment of a transmission channel is applied in inverse time order to another segment of that same transmission channel. Hence, delays impressed upon a given frequency component of the signal portion by the second transmission channel segment tend to compensate, in the time-inverted signal, for the velocity dispersion effects imposed on it by the first transmission channel segment.

S. L. Smith and J. C. R. Licklider have reported in the Journal of the Acoustic Society of America for January 1954, on page 138, experiments directed toward determining psychological and physiological effects of acoustic delay distortion. To further their investigative purposes Smith and Licklider have employed a time reversal technique. The present invention turns this principle of time reversal to account by combining apparatus for effecting such a time reversal with standard transmission channel elements. With this combination the invention achieves the complete elimination of delay distortion by a proper employment of the channel elements themselves.

The invention will be more fully understood and its other objects, features and advantages will appear from a consideration of the appended claims and the following brief description of the drawings, in which:

Figure 1:
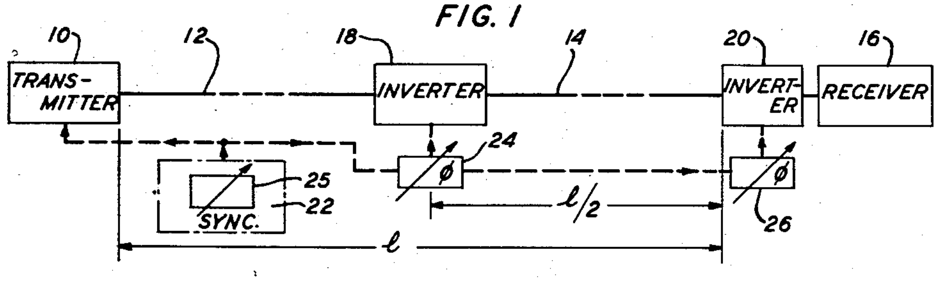
Fig. 1 is a simplified diagrammatic illustration of an illustrative embodiment of the invention.
Figure 2:
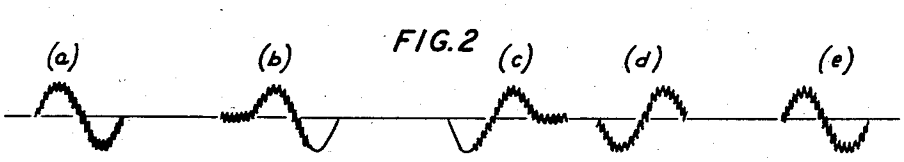
Fig. 2 is an illustration of signal waveforms which is of assistance in describing the operation of the illustrative embodiment of the invention shown in Fig. 1.

Referring now more particularly to the drawings, Fig. 1 shows a transmitting station 10 having a generator of a time signal which may have a waveform such as that illustrated in Fig. 2(*a*). A transmission channel, comprising two segments 12 and 14 together having an electrical length $l$, is connected at one terminal to the transmitting station. The "electrical length" of this actual transmission channel, as the term is employed herein, defines the physical length of a standard channel having uniform electrical characteristics which, in sum, are identical with those of the actual channel under discussion. A receiving station 16 for utilizing transmitted signals is connected to the opposite terminal of the transmission channel. Interposed in the transmission channel at its electrical midpoint, between the two segments 12 and 14, is a signal time-inverting device 18 which may be one of alternative devices well known in the art. A convenient prior art device for accomplishing this inverting function is discussed hereafter in consideration of Fig. 4.

A signal reinverter 20, which may be constructed like the aforementioned inverter or like one of the well known alternative inverters, is provided to connect the receiving station to the transmission channel at the receiving terminal.

The inversion of a signal in the time domain requires that, in the usual case, the signal be divided into distinct units. Physical limitations of known time order inverters, in view of the extended duration of most signals, necessitate that those signals, for example, signals arriving at the first inverter 18, be inverted in discrete portions rather than in their entirety. Further, an undesirable delay in the transmission of an entire signal would be introduced into a system were an entire signal time-inverted as a unit, rather than in smaller portions. Hence, it is desirable to provide means for subdividing signals arriving at the inverter 18.

For like reasons it is desirable that signals arriving at the reinverter 20 be similarly subdivided. Even more, it is advantageous that the subdivision of signals at the reinverter 20 be related in time to the subdivision accomplished at the inverter 18 in order to insure coherent cooperation of the two inverting units in accordance with the invention.

The invention takes these considerations into account by providing a synchronizer 22 which is shown illustratively connected for providing synchronizing signals to the transmitting station 10 and, through well-known delay adjusting networks 24 and 26, to the two signal inverters 18 and 20. This synchronizer may be one of several well-known types, for example, a sine wave oscillator. This oscillator has its frequency controlled by a frequency adjuster 25 which may, for example, be a variable capacitor connected into the oscillator control circuit.

This synchronizer, through well-known circuitry, fixes a common period for the operation of the inverters 18 and 20 and thereby establishes like time subdivisions of the signals upon which each of the inverters operates. The duration of these signal subdivisions is controlled in this illustrative embodiment by the variation of the frequency of the synchronizer 22. The adjusting networks 24 and 26 provide for a correct phase relationship in the operation of the two inverters, already operating with like periods, to ensure that identical signal subdivisions are inverted by the inverters 18 and 20 rather than mere unrelated subdivisions of like duration.

While in this illustrative embodiment a single central synchronizer has been shown, it is readily apparent to one skilled in the art that engineering considerations might dictate other devices for accomplishing the above-discussed functions in other systems. For example, in an extended transmission system good engineering practice might dictate that independent synchronizing apparatus might be provided locally at each individual inverter station. Such apparatus, as comprehended by the invention, would derive from the transmitted signal itself information necessary to proper synchronization of the signal inverters.

The transmission channel 12, 14, like virtually all transmission channels, has a velocity dispersive effect upon complex signals applied to it. This means that different frequency components of a signal applied to the transmission channel are propagated at different velocities along its length. The velocity dispersion thus impressed upon the various components of a given signal wave disarranges the time relationship of these components. Hence, at a receiving terminal of the transmission channel the waveform of an input signal becomes distorted. This phenomenon is known as time delay distortion.

An illustration of such distortion is seen in Fig. 2. Fig. 2($a$) shows the waveform of a signal applied to the Fig. 1 transmission channel 12. This signal consists in a high frequency oscillation superimposed on a low frequency sine wave. In Fig. 2($b$) the waveform of this signal is shown after it has experienced time delay distortion in traveling along that portion 12 of the transmission channel lying between the transmitting station 10 and the signal time inverter 18. This arrival signal, shown in Fig. 2($b$), is related to the signal shown in Fig. 2($a$), but the high frequency oscillations, being delayed, trail the low frequency sine wave upon which they are superimposed at the transmitting station.

In accordance with the invention, the signal time inverter 18 accepts the distorted signal represented by the waveform of Fig. 2($b$) and inverts its time order to yield a signal having the waveform of Fig. 2($c$). In this Fig. 2($c$) it is seen that the portion of the now inverted signal which represents the original low frequency sine wave is trailing, instead of preceding, the portion of the signal representing the superimposed high frequency oscillation. This time-inverted signal of Fig. 2($c$) is propagated over the transmission channel segment 14 toward the receiving station.

It is apparent that the delayed frequency component of the original signal is now advanced in time, through the operation of the inverter, by the exact amount of its delay in passing through the first portion 12 of the transmission channel to the inverter 18. Hence, as this time-inverted signal, having the waveform illustrated in Fig. 2($c$), is propagated over the second transmission channel segment 14 toward the receiving station, the second transmission channel segment acts to undo the delay distortion imposed in traversing the first portion of the channel. The signal frequency component which the channel tends most to delay has been advanced in time by the inversion process. The second transmission channel segment tends to bring this high frequency component into proper relationship with the other component which experiences less delay in traversing the channel.

Since the signal inverter is interposed in the transmission channel at its electrical midpoint, the delay distortion imposed by the second transmission channel segment 14 exactly counteracts that imposed by the first channel segment 12. Consequently, the signal arriving at the receiving station has all its frequency components in their exact original time relationship. Whence, the signal arriving at the receiving station has a waveform, as illustrated in Fig. 2($d$), in which the two frequency components are restored to their original time relationship, with all delay distortion eliminated.

All time delay distortion has been eliminated but the signal, as illustrated by the waveform of Fig. 2($d$), is inverted in time. To rectify this condition the invention provides the second signal time inverter 20 which also serves to interconnect the receiving station with the transmission channel receiving terminal. This signal reinverter 20 may be of the same type as the inverter 18 or may be any one of the other such devices known in the art.

Figure 3:
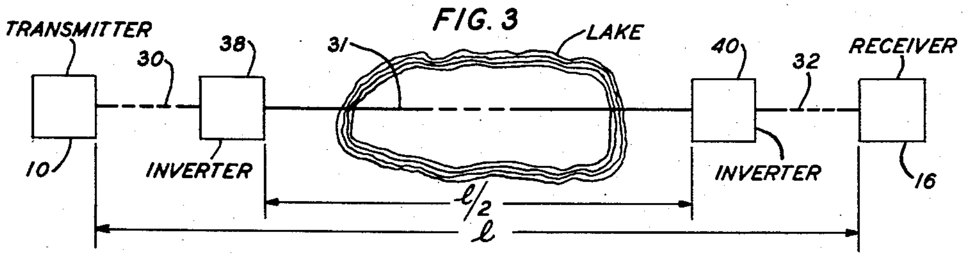
Fig. 3 is a diagram of another preferred embodiment of the invention.

Turning next to Fig. 3, there is seen a preferred embodiment of the invention which takes into account another feature of the invention. A transmission medium, that is to say, an extended channel designed for translating signals through space, which comprises three segments 30, 31 and 32, having together a fixed electrical length $l$, interconnects a receiving station 16 with a transmitting station 10, which applies an intelligence signal to the transmission medium. In an actual transmission system the electrical midpoint of the transmission channel might well be inconvenient, from an operational viewpoint, for the installation of a signal inverter as discussed in connection with the embodiment shown in Fig. 1. The practice of the invention, however, is not defeated by such an event.

As shown in Fig. 3, a lake prevents employment of the system illustrated in Fig. 1 for delay distortion elimination. But the invention is employed to eliminate delay distortion from this transmission system with facility.

A first signal inverter 38 is interposed in the transmission medium between the segment 30 and the segment 31 at a convenient point removed from the transmitting station by less than one-half the electrical medium length $l$. This inverter 38 has internal circuit provisions for self-synchronization as discussed in connection with the system illustrated in Fig. 1. A second similar signal inverter 40 is interposed in the transmission medium at a second point which is located further along the transmission medium, removed from the first point by an electrical distance equal to just one-half the electrical distance separating the transmitting and the receiving stations.

In this embodiment, the signal transmitted toward the first inverter is subject to a delay distortion directly proportional to the electrical length of the medium joining the transmitting station with the first inverter. From that first inverter the distorted signal is transmitted in inverted time order over the transmission medium segment 31 which has an electrical length equal to one-half the total electrical length $l$ of the medium which interconnects the transmitting station with the receiving station. In this transmission over the segment 31, signal components, which are delayed in time by the first transmission medium segment 30 and are next advanced by the first inverter 38, are now delayed again by the half length transmission medium segment 31.

In the second inverter 40 the most delayed signal components are once again advanced beyond their less delayed companion components. In this second inverter, too, the normal time order of the signal wave is once more restored. Accordingly, as the signal travels toward the receiving station, delay distortions introduced by the medium are eliminated and the signal arrives at the receiving station with the exact phase relationship between the various signal components that existed in the originally transmitted signal. The signal wave, too, is arranged in its original time order.

In better perspective the operation of the invention may be viewed as follows: The signal in its normal time order is transmitted over a given length of transmission medium, the segments 30 and 32, whereby a delay distortion proportional to that length is impressed upon the normal order signal. The signal in its inverted time order form is also transmitted over a transmission medium segment, the segment 31, chosen so that an equal amount of delay distortion is imposed upon the inverted time order signal. Since, in the inversion of the signal, time delays become time advances, and vice versa, the proper choice of the indicated electrical lengths in accordance with the invention leads to a complete elimination of delay distortion by the operation of the transmission medium itself.

Figure 4:
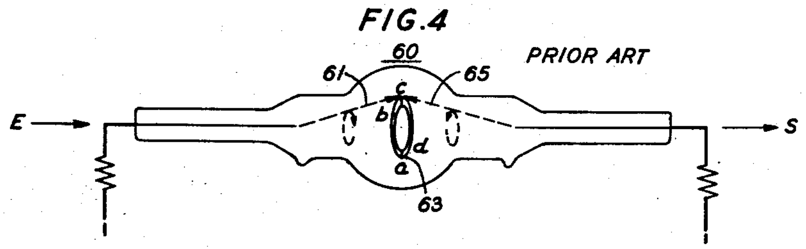
Fig. 4 is a functional diagram of apparatus taught by the prior art which may be usefully employed in the practice of the invention.

Fig. 4 shows principal elements of an electron beam storage tube 60 which may conveniently be adapted for employment as the inverting device of the invention. This double electron beam tube 60 may, for example, be one such as described in F. Schröter Patent 2,175,573, granted October 10, 1939. A first clockwise rotating electron beam 61 writes, on one of the surfaces of an electrically transparent electron storage plate 63, a space pattern representing an incoming electric time signal E which modulates the electron beam 61. A counter-rotating electron beam 65, directed at the opposite surface of the plate 63 and rotating at the same speed as the first, writing, electron beam 61, reads out in reverse time order the signal inscribed by the first beam, thereby to derive an output signal S.

The rotation of the electron beams 61 and 65 is brought about by orthogonally oscillatory magnetic fields such as, for example, those taught by Schröter. Appropriate circuit connections are made between the synchronizer and the necessary magnetic field generators so that adjustment of the synchronizer frequency controls the oscillation frequency of these magnetic fields. Hence, the synchronizing adjuster 25 may control the duration of signal segments inverted by the tube 60.

In more detail, this double beam tube is employed in accordance with the invention as set forth below. The recording beam 61, having completed recording a portion of the incoming signal E over the arc *abc* which lies on the semiperimeter of the storage plate 63, continues to record a next signal portion over an opposite semiperimeter *cda* of the plate. Meanwhile, the counter-rotating readout beam 65 begins to read out, in inverse order, the signal already established over the arc *cba*. Thus, as the two beams continue their counter-rotation at the same speed, their angular positions simultaneously intercept the two opposite points *a* and *c* on the perimeter of the storage plate 63.

This suggests an apparent compromise in the perfection of the invention. This compromise is more apparent than real insofar as harmful effects upon signal transmission are concerned. Illustratively, an undelayed component of the signal E, arriving at an instant when the writing beam 61 lies in a position at point *b* on the arcuate recording perimeter *abc*, may have associated with it delayed components which do not arrive until a time corresponding to a beam recording position at point *c*. Hence, it follows that the counter-rotating readout beam 65, as it immediately sweeps the arc *cb*, does not transduce all the delayed signal components associated with the signal components which have been recorded in this arc.

Accordingly, in the transmission of continuous signals, the invention comprehends complete elimination of all delay distortion over a preponderant portion of the successive recording intervals and an acceptance of minor residual distortion. But the invention in so doing takes advantage of the further fact that a normal continuous wave signal, e.g., a voice telephone signal, may, indeed, be afflicted with some residual delay distortion without any effect being apparent to the human ear. Hence, the invention eliminates from such continuous wave signals all delay distortion needed to satisfy the requirements of the human sense involved. This is accomplished simply, in the practice of the invention, by mere adjustment of the individual inverting periods to the length of transmission channel between the inverters. The period adjustment in turn is accomplished by means of the synchronizer adjuster 25 shown in Fig. 1.

Alternatively, the invention comprehends the employment of a plurality of tandem connected transmission channel lengths with each length having an associated inverter pair. Thus, each inverter pair operates as above discussed to eliminate delay distortion imposed by a particular channel length.

While some types of signals may tolerate residual delay distortions with no appreciable effect, such is not always the case. The acute human eye, for example, readily detects any small distortion in an image formed by a television video signal. The invention, however, is particularly adapted to eliminate completely all delay distortion from such a precision signal as this video signal. In doing this, the invention takes advantage of the fact that television video systems, to achieve their precision, employ signals which occur in successive like time intervals each one of which is terminated in a blank interval.

Figure 5:
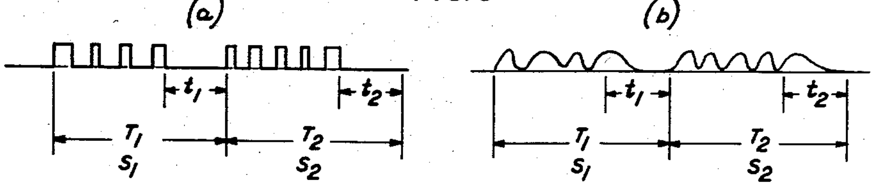
Fig. 5 is a representation of signal waveforms of assistance in discussing the employment of the prior art device of Fig. 4 in the systems shown in Figs. 1 and 3.

The invention's particular adaptation to perfect transmission of such a signal can be seen more readily by referring to Fig. 5 in connection with the device of Fig. 4. Fig. 5(*a*) shows two successive television-like signal subdivisions, $S_1$ and $S_2$, having like durations $T_1$ and $T_2$ and being terminated in like blank intervals, $t_1$ and $t_2$, respectively. Fig. 5(*b*) illustrates the waveforms of these signal subdivisions after they have been subjected to delay distortion by a transmission channel. The transmission channel length associated with a pair of inverters is chosen so that delayed components of the signal subdivisions $S_1$ and $S_2$ have not been disarranged in time relationship from their associated undelayed components to extend beyond the blank intervals $t_1$ and $t_2$. Hence, in the practice of the invention, each of these so distorted signal subdivisions $S_1$ and $S_2$, as illustrated in Fig. 5(*b*), is inverted in turn upon the expiration of the blank intervals $t_1$ and $t_2$ and all delay distortion is completely eliminated.

What is claimed is:

1. In a system for intelligence signal communication between a transmitting station and a receiving station, a transmission medium interconnecting said transmitting station with said receiving station, said medium having a fixed electrical length and having a velocity dispersive response to signal components of different frequencies, whereby delay distortion is introduced into signals transmitted through said medium, generating means for applying an intelligence signal to said transmission medium at said transmitting station, a first means for instantaneously and continuously inverting the time order of successive segments of said intelligence signal thereby to convert said intelligence signal into a plurality of consecutive time-order-inverted signal segments, and a second means for instantaneously and continuously inverting the time order of successive segments of said converted signal, said first and second means being respectively interposed in said transmission channel at points mutually separated by one-half of said electrical length, whereby delay distortions imposed upon said intelligence signals in traversing said medium are eliminated.

2. Apparatus as set forth in claim 1, and in combination therewith means for synchronizing the operation of said first and second inverting means with the arrival of like segments of said intelligence signal at said means respectively, whereby like segments of said signal are successively inverted by said time order inverting elements.

3. Apparatus as set forth in claim 2, wherein said synchronizing means includes means for adjusting the rate of operation of said inverting elements.

4. Apparatus as set forth in claim 1, wherein said generating means comprises means for generating a succession of intelligence signal subdivisions each extending throughout a like interval, each of said intervals being terminated in a blank period.

5. In combination with apparatus as set forth in claim 4, synchronizing means for successively actuating each of said inverting means upon the termination of like signal subdivisions respectively.

6. In a system for communication between a transmitting station and a receiving station, a transmission channel interconnecting said transmitting station with said receiving station, said transmission channel having a fixed electrical length and having a velocity dispersive response to signals of different frequencies applied thereto, generating means for applying a time signal to said transmission channel at said transmitting station, said time signal comprising a succession of signal subdivisions, each subdivision being terminated in a blank interval, whereby said signal is propagated through said channel to said receiving station, a pair of signal time order inverting elements instantaneously and continuously inverting the time order of successive segments of said time signal and the time order of the inverted time signal respectively, said elements being respectively interposed in said channel at two points mutually separated by one-half of said electrical length, and synchronizing means for successively actuating each of said inverting elements upon the arrival thereat of like successive ones of said signal subdivisions.

7. Apparatus as set forth in claim 5, wherein one of said inverting elements is interposed in said channel at the midpoint of said electrical length.

8. In a system for communication between a transmitting station and a reeciving station, a transmission channel interconnecting said transmitting station with said receiving station, said transmission channel having a fixed electrical length and having a velocity dispersive response to signal components of different frequencies applied thereto, generating means for applying a time signal to said transmission channel at said transmitting station, a pair of time order signal reversing elements substantially instantaneously and continuously inverting the time order of successive segments of said time signal and the resultant inverted time signal respectively interposed in said transmission channel at points mutually separated by one-half of said electrical length, and synchronizing means for successively actuating each one of said pair of reversing elements for reversing a like subdivision of said time signal.

9. In a system for communication between a transmitting station and a receiving station, a transmission channel interconnecting said stations, said channel having a fixed electrical length and a velocity dispersive response to signal components of different frequencies applied thereto, generating means for applying an intelligence signal to said transmission channel at said transmitting station, and a pair of signal time order inverting elements interposed in said channel at two points spaced apart by one-half said electrical length instantaneously and continuously inverting the time order of successive segments of said intelligence signal and of the inverted intelligence signal respectively, one of said points lying in said channel intermediate between the electrical midpoint of said channel and one of said stations.

References Cited in the file of this patent

UNITED STATES PATENTS

| | | |
|---|---|---|
| 2,175,573 | Schröter | Oct. 10, 1939 |
| 2,446,479 | Begun | Aug. 3, 1948 |
| 2,629,782 | Ring | Feb. 24, 1953 |